(12) United States Patent
Baudelocque et al.

(10) Patent No.: US 7,986,066 B2
(45) Date of Patent: Jul. 26, 2011

(54) JACKETED AXIAL MAGNETIC BEARING

(75) Inventors: Luc Baudelocque, Vernon (FR);
Maurice Brunet, Sainte Colombe Pres Vernon (FR); David Moulin, Paris (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 191 days.

(21) Appl. No.: 12/538,397

(22) Filed: Aug. 10, 2009

(65) Prior Publication Data

US 2010/0187926 A1 Jul. 29, 2010

(30) Foreign Application Priority Data

Nov. 3, 2008 (FR) ...................................... 08 57455

(51) Int. Cl.
*H02K 7/09* (2006.01)
(52) U.S. Cl. ......................................... 310/90.5; 310/89
(58) Field of Classification Search .............. 310/88–89, 310/90.5, 268, 254.1
See application file for complete search history.

(56) References Cited

U.S. PATENT DOCUMENTS

| | | | |
|---|---|---|---|
| 3,223,043 A | | 12/1965 | Shapiro |
| 4,180,296 A | * | 12/1979 | Habermann ............... 310/90.5 |
| 4,353,602 A | * | 10/1982 | Habermann ............... 310/90.5 |
| 4,920,291 A | * | 4/1990 | McSparran ............... 310/90.5 |
| 5,072,146 A | * | 12/1991 | New ........................... 310/90.5 |
| 5,084,644 A | * | 1/1992 | Harris et al. ............... 310/90.5 |
| 5,153,475 A | * | 10/1992 | McSparran ............ 310/216.021 |
| 5,698,917 A | | 12/1997 | Shultz |
| 2004/0112800 A1 | | 6/2004 | Ogino et al. |

FOREIGN PATENT DOCUMENTS

| | | |
|---|---|---|
| EP | 1137126 | 9/2001 |
| EP | 1830081 | 9/2007 |
| EP | 1967286 | 9/2008 |

\* cited by examiner

*Primary Examiner* — Thanh Lam
(74) *Attorney, Agent, or Firm* — Weingarten, Schurgin, Gagnebin & Lebovici LLP

(57) ABSTRACT

The invention relates to a jacketed axial magnetic bearing for a rotary machine having a rotor in contact with a gaseous atmosphere that is corrosive, acid, or carrying particles, the bearing comprising a rotor armature in the form of a disk secured to the rotor and placed in the gaseous atmosphere, and a stator magnetic circuit secured to a stationary support device and placed facing the rotor armature, the magnetic circuit of the stator comprising at least one coil and a ferromagnetic body placed in a metallic protective enclosure. The protective enclosure comprises firstly an annular support of channel section with a web and inner and outer flanges presenting a thickness of several millimeters and a length that is less than the length of the stator magnetic circuit, and secondly an annular jacket in the form of a channel-section cover machined from a solid piece and thus without welds, the jacket having inner and outer flanges and a closure web presenting a thickness smaller than the thicknesses of the inner and outer flanges, the free ends of the inner and outer flanges of the jacket being welded to the free ends of the inner and outer flanges of the annular support.

11 Claims, 3 Drawing Sheets

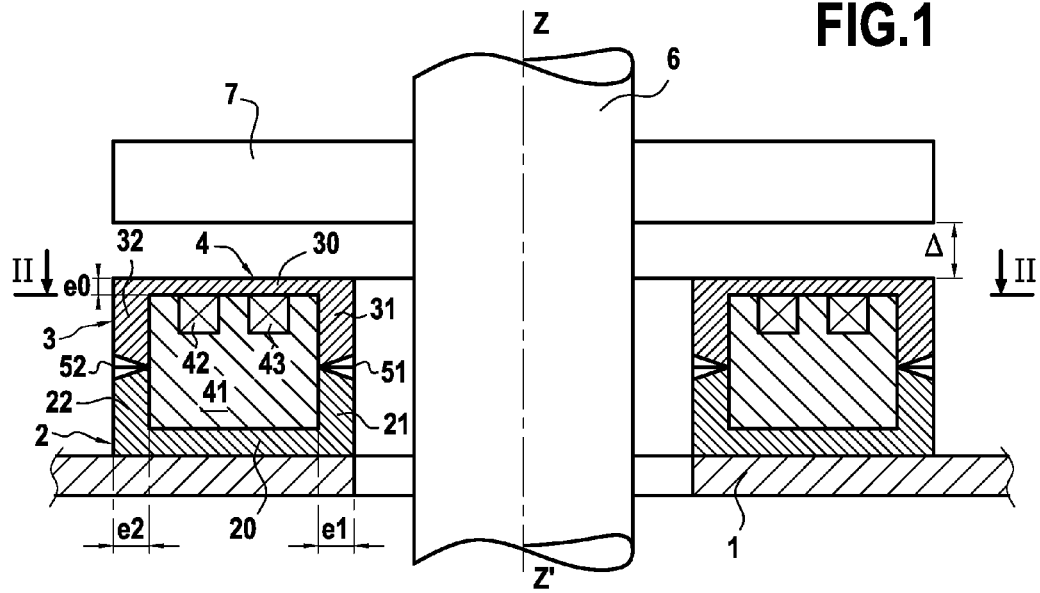
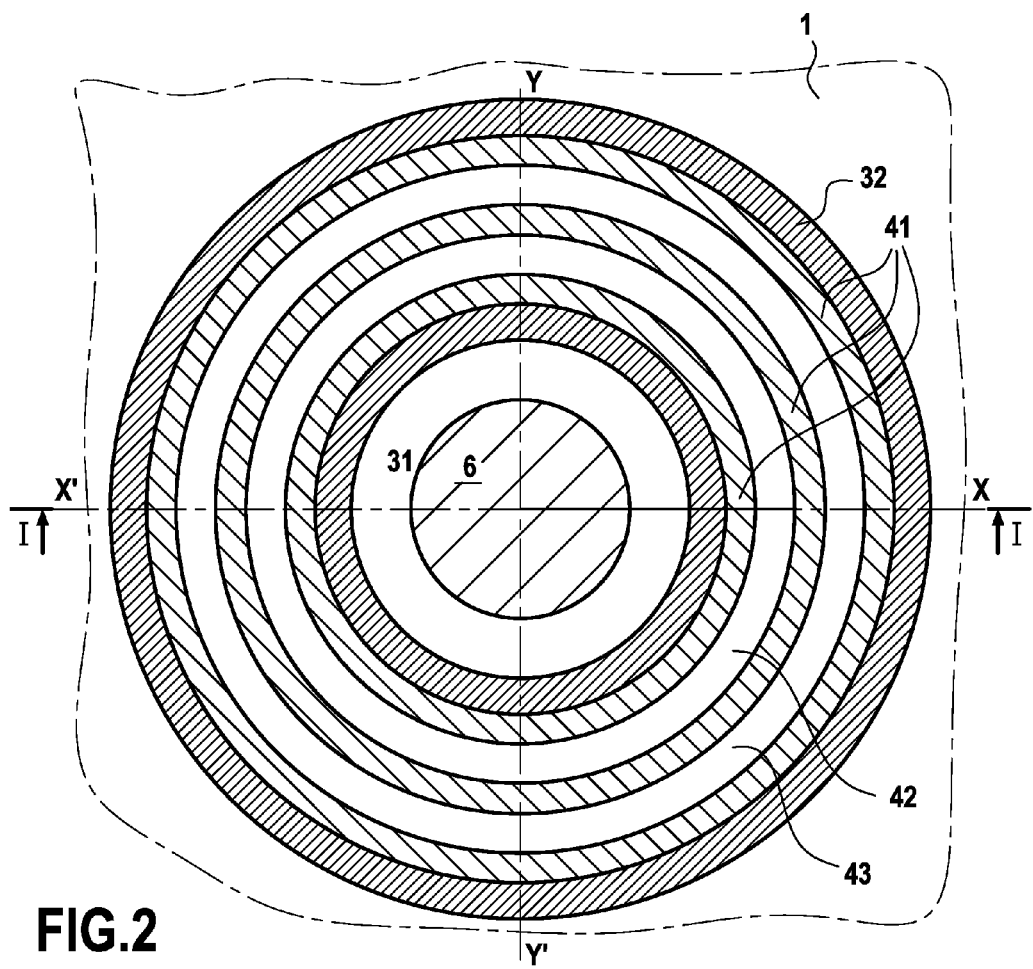

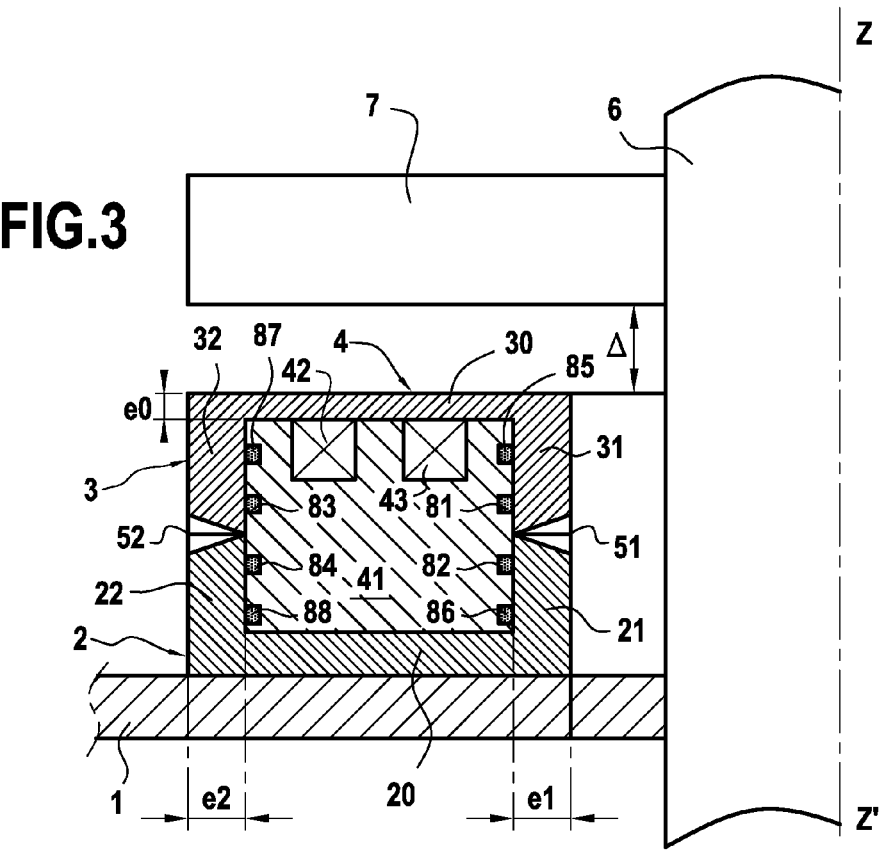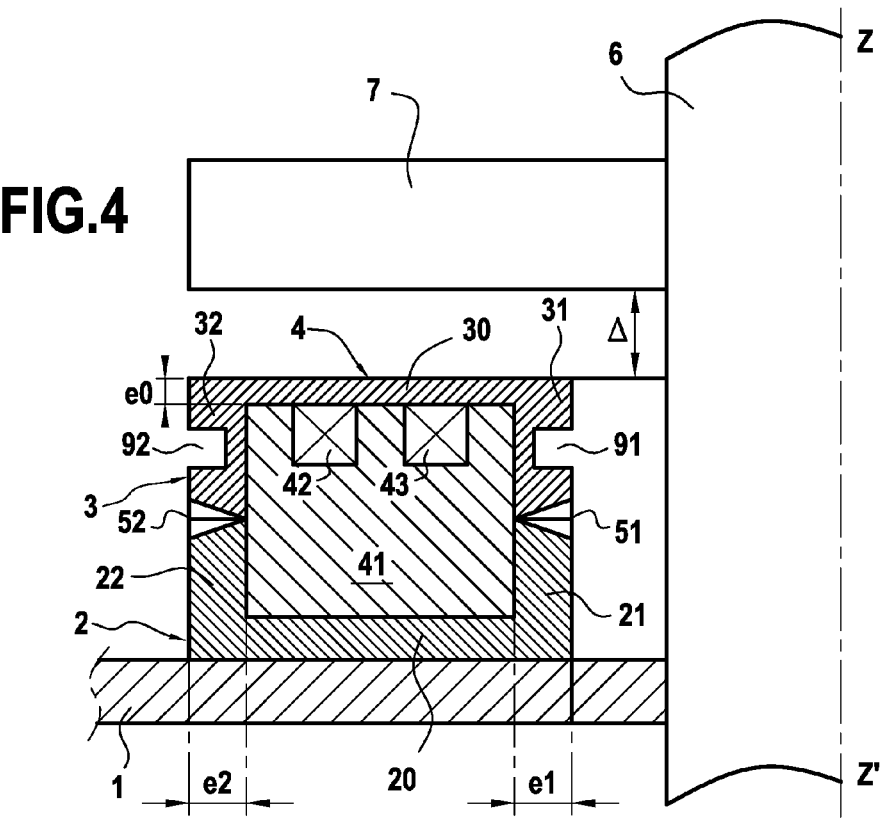

ART ANTERIEUR

JACKETED AXIAL MAGNETIC BEARING

FIELD OF THE INVENTION

The present invention relates to a jacketed axial magnetic bearing for a rotary machine fitted with a rotor in contact with a gaseous atmosphere that is corrosive, acid, or carrying particles.

PRIOR ART

A jacketed active magnetic bearing has already been described, e.g. in document EP 1 830 081 A1, that is suitable for application to a radial bearing or an axial bearing. One such type of jacketed bearing is designed to work in surroundings that are dirty or corrosive.

Accompanying FIG. 6 shows an example of a prior art jacketed axial bearing that comprises a rotor armature 107 in the form of a disk secured to a rotor 106 and placed in a gaseous atmosphere that is corrosive, acid, or carrying particles.

A stator magnetic circuit 104 secured to a stationary support device 101 is placed facing the rotor armature 107. The stator magnetic circuit 104 comprises at least one coil 142, 143 and a ferromagnetic body 141 placed in a metal protective enclosure 102, 103.

The protective enclosure 102, 103 comprises an annular support 102 having a web 120 and inner and outer flanges 121 and 122 that present thicknesses d1 and d2 of several millimeters, and that extend over the full height of the ferromagnetic body 141.

A jacket 103 in the form of a plate presenting a thickness d0 is fitted on the annular support 102 and is welded via welding zones 151 and 152 to the free ends of the inner and outer flanges 121 and 122 of the annular support 102.

The annular support 102 may be made of a stainless material, e.g. such as magnetic stainless steel, in particular of the 17-4 PH type. The jacket 103 or closure plate may be made out of the same material as the annular support 102, out of 17-4 PH stainless steel, or it may be of a different metallic material, such as Inconel for example.

The jacket 103 is welded to the annular support 102 by laser welding, by electron bombardment, or by tungsten inert gas (TIG) welding.

The operation of the bearing is not optimized if the thickness d0 of the jacket 103 is too great, since the distance between the stator magnetic circuit 104 and the rotor armature 107 is too great and the attraction capacity of the bearing is then too limited.

It is therefore desirable for the thickness d0 of the jacket 103 to be reduced and for the jacket 103 to be constituted by a fine metal sheet, typically having a thickness of 0.5 millimeters (mm). Nevertheless, this raises difficult design problems.

It should be observed that although using jacketed bearings make it possible to work in surroundings that are dirty or corrosive, the use of them in pressurized operation requires sealing that is perfectly hermetic over time so as to avoid problems associated with decompression (explosive depressurization, deformation by swelling).

The fabrication of a jacketed axial bearing thus leads to limits that are specific to its shape. Jacketing with a fine metal sheet (typically 0.5 mm thick) that is flat and of large dimensions (for example an axial abutment for 45,000 newtons (N) typically has an outside diameter of 470 mm and an inside diameter of 270 mm) gives rise to an assembly that is very sensitive to the different coefficients of thermal expansion of the materials involved.

Although the materials used are selected to have coefficients of thermal expansion that are equal, the method of fabrication and machining can have a significant influence.

For example, a steel sheet made of 17-4 PH stainless steel or of Inconel (both of which are materials that are typically used for jacketing bearings) that has been thoroughly rolled may have coefficients of expansion that are different from a solid support made of the same material.

Furthermore, under the effect of the surrounding temperature and pressure, the welds connecting the plate-shaped jacket to the solid support may be subjected to high levels of stress if the various elements do not expand and contract in identical manners.

Because the airgap Δ generally has a dimension of the order of 0.4 mm to 1.2 mm, when the closure sheet expands more than the support, even if by an amount that is as little as about 5 micrometers (μm), the sheet is put into compression and deforms to such an extent that it might touch the rotor (as a result of a deformation bulge that may be as great as 0.6 mm or 0.7 mm, for example, for the 5 μm of deformation applied to the above-mentioned 45,000 N abutment). Simultaneously, the welds connecting the sheet to the support are subjected to stress.

When the stator expands to a greater extent than the closure sheet, then the welds pull on the sheet and they are therefore subjected to traction stresses.

DEFINITION AND OBJECT OF THE INVENTION

The present invention seeks to remedy the above-mentioned drawbacks and to enable a jacketed axial magnetic bearing to accommodate coefficients of expansion that are slightly different between a jacket and its support, the jacket being constituted by a relatively thin sheet, without subjecting the connecting welds to excessive levels of stress, and without running the risk of the jacket deforming to such an extent as to come into contact with the rotor armature of the bearing.

In accordance with the invention, these objects are achieved by a jacketed axial magnetic bearing for a rotary machine having a rotor in contact with a gaseous atmosphere that is corrosive, acid, or carrying particles, the bearing comprising a rotor armature in the form of a disk secured to the rotor and placed in said gaseous atmosphere, and a stator magnetic circuit secured to a stationary support device and placed facing said rotor armature, the magnetic circuit of the stator comprising at least one coil and a ferromagnetic body placed in a metallic protective enclosure, wherein said protective enclosure comprises firstly an annular support of channel section with a web and inner and outer flanges presenting a thickness of several millimeters and a length that is less than the length of the stator magnetic circuit, and secondly an annular jacket in the form of a channel-section cover machined from a solid piece and thus without welds, the jacket having inner and outer flanges and a closure web presenting a thickness smaller than the thicknesses of the inner and outer flanges, the free ends of the inner and outer flanges of the jacket being welded to the free ends of the inner and outer flanges of said annular support.

This obtains a surface of small thickness e0 without any welding that is sensitive to thermal or other stresses.

In one possible embodiment, the annular jacket is shrink-fitted on said ferromagnetic body, thus enabling different coefficients of expansion to be accommodated.

Under such circumstances, it is advantageous for the annular jacket to present a coefficient of expansion that is slightly smaller than that of the ferromagnetic body, thereby enabling tension to be applied to the jacket when temperature increases.

In another possible embodiment, the annular jacket includes flexibility grooves formed in the inner and outer flanges, thereby enabling stresses to be relieved at the welds.

According to yet another advantageous characteristic of the present invention, the bearing includes at least first and second O-rings disposed on either side of the weld between the inner flange of the jacket and the inner flange of the annular support, and third and fourth O-rings disposed on either side of the weld between the outer flange of the jacket and the outer flange of the annular support.

Under such circumstances, and advantageously, each of said first, second, and third, and fourth O-rings comprises a pair of O-rings providing double sealing.

The O-rings enable a second hermetic sealing barrier to be installed and they compensate for the defects that might appear in the event of welds being implemented that are not completely hermetically sealed.

BRIEF DESCRIPTION OF THE DRAWINGS

Other characteristics and advantages of the invention appear on reading the following description of particular embodiments of the invention given as examples and with reference to the accompanying drawings, in which:

FIG. 1 is an axial section view on line I-I of FIG. 2, showing a first embodiment of a jacketed axial magnetic bearing of the invention;

FIG. 2 is a radial section view on line II-II of FIG. 1;

FIG. 3 is an axial half-section view of a second embodiment of a jacketed axial magnetic bearing of the invention;

FIG. 4 is an axial half-section view of a third embodiment of a jacketed axial magnetic bearing of the invention;

DETAILED DESCRIPTION OF PREFERRED EMBODIMENTS

Figure 5:
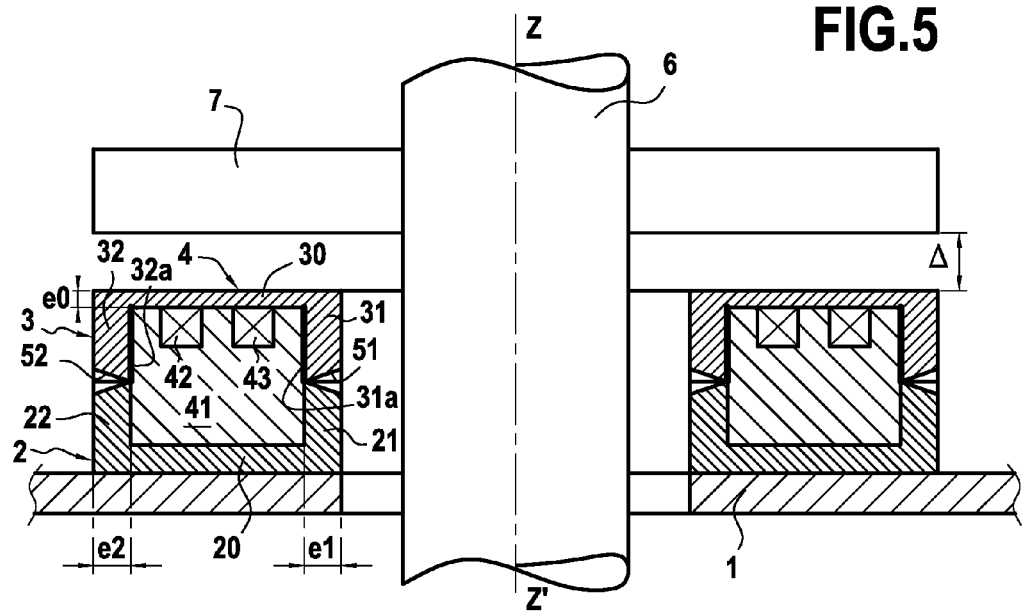
FIG. 5 is an axial section view of a fourth embodiment of a jacketed axial magnetic bearing of the invention.
Figure 6:
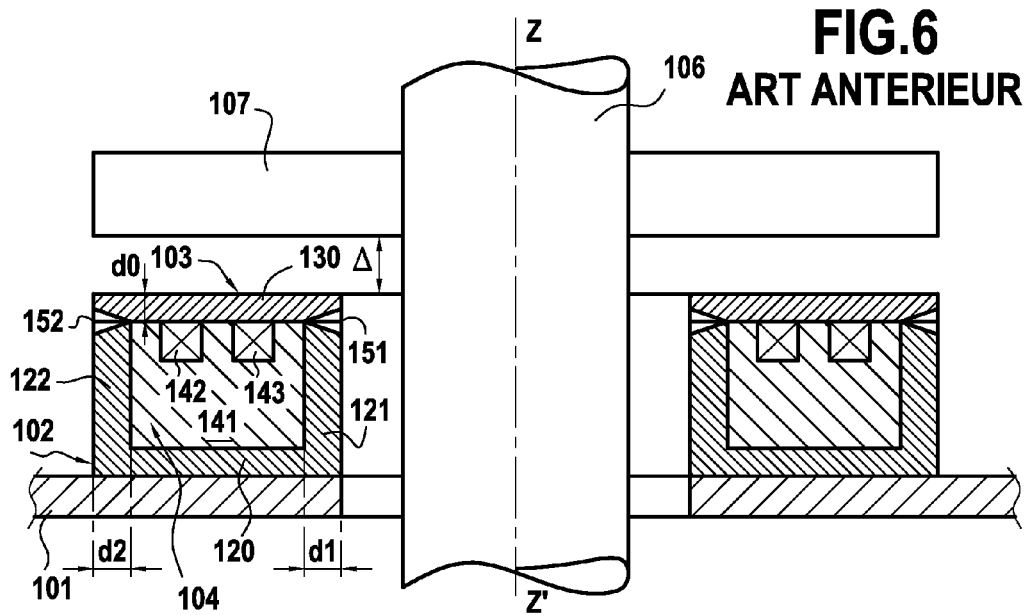
FIG. 6 is an axial section view of a prior art jacketed axial magnetic bearing.

FIGS. 1 and 2 show a first embodiment of a jacketed axial magnetic bearing of the present invention.

This axial bearing comprises a stator magnetic circuit 4 including, in conventional manner, one or more annular coils 42, 43 and a ferromagnetic body 41, the stator magnetic circuit 4 being placed facing a rotor armature 7 secured to a rotary shaft 6 of axial ZZ'. The ferromagnetic body 41 may be solid or it may be laminated locally.

The stator magnetic circuit 4 is placed in a sealed metallic protective enclosure 2, 3 that is itself secured to a stationary support member 1.

The stator magnetic circuit 4 and its protective enclosure 2, 3 define an airgap Δ relative to the rotor armature 7. The airgap Δ may lie in the range 0.4 mm to 1.5 mm, and preferably in the range 0.4 mm to 1.2 mm.

The protective enclosure of the stator magnetic circuit 4 comprises, firstly, an annular support 2 of channel section with a web 20 and inner and outer flanges 21 and 22. The inner and outer flanges 21 and 22 present respective thicknesses e1 and e2, each of several millimeters, e.g. lying in the range 3 mm to 10 mm, and a length in the direction of the axis ZZ' of the rotary shaft 6 that is less than the width of the ferromagnetic body 41 of the stator magnetic circuit 4.

The protective enclosure of the stator magnetic circuit 4 comprises, secondly, an annular jacket 3 forming a channel-section cover machined from a solid, with a closure web 30 presenting a thickness e0 that is less than the thickness of its inner and outer flanges 31 and 32 that present respective thicknesses e1 and e2 of several millimeters that are substantially equal to the thicknesses of the inner and outer flanges 21 and 22 of the annular support 2, without necessarily being identical thereto.

The free ends of the inner and outer flanges 31 and 32 of the jacket 3 are welded to the free ends of the inner and outer flanges 21 and 22 of the annular support 2. The weld zones 51 and 52 are thus made between parts having thicknesses of several millimeters, where the thicknesses e1 and e2 are advantageously greater than 3 mm.

The welds 51 and 52 between the jacket 3 and the annular support 2 may be made, for example, by laser welding, by electron bombardment, or indeed by TIG welding.

The closure web 30 of the annular jacket 3 is preferably of small thickness, less than the thickness of the flanges 31 and 32, which small thickness may lie in the range 0.3 mm to 2 mm, and preferably in the range 0.4 mm to 1 mm, so as to avoid excessively increasing the distance between the ferromagnetic magnetic circuit 41 and the rotor armature 7.

The annular support 2 and the jacket 3 may be made for example out of a magnetic stainless steel, in particular of the type 17-4 PH, however other materials are also possible. Furthermore, the material of the jacket 3 may differ from that of the annular support 2. Thus, the jacket 3 could be made for example out of Inconel.

In this assembly of the invention, the jacket 3 constituting the closure sheet is of channel section. This channel section is machined from a solid piece of material presenting considerable thickness (optionally obtained by the same method as the material constituting the annular support 2).

The flat of the active face (outside face of the web 30) is machined by fine machining so as to minimize any change in the characteristics of the materials until the desired thickness e0 (typically 0.5 mm) is obtained.

The flanges 31 and 32 of the channel section are machined so as to present respective thicknesses e1 and e2 that are much greater, and the jacket is welded onto its support 2 at the bottom of the (upside-down) channel section enabling much thicker welds 51, 52 to be used (typically 5 mm instead of 0.5 mm), thereby guaranteeing greater robustness and much better hermetic sealing than are possible with embodiments requiring thin materials to be welded together, of the kind known in the prior art.

In addition, the channel-section jacket 3 may be installed on the ferromagnetic support 41 by shrink fitting through several tens of micrometers so as to accommodate the small difference in coefficient of thermal expansion by establishing prestress in the jacket 3 (see the embodiment of FIG. 5 with shrink-fit zones 31a and 32a created in the vicinity of the flanges 31 and 32 of the jacket 3). Under such circumstances, the jacket 3 preferably presents a coefficient of expansion that is smaller than that of the ferromagnetic body 41.

In addition, locating the welds 51 and 52 so that they are offset to the ends of the flanges 31 and 32 of the jacket 3 enables the mechanical loading on the welds to be modified so as to reduce the stresses thereon and thus guarantee the integrity thereof. No thin material weld is then subjected to direct traction and compression stresses. The length of the flanges 31 and 32 of the jacket 3 then has a direct influence on the loading of the welds 51 and 52 by demultiplying the bending angle. The flanges 31 and 32 of the channel-section therefore need to be sufficiently long to minimize stresses in the welds 51 and 52 due to the differing expansions and contractions.

In addition, O-ring gaskets 81 to 88 are easily incorporated so as to make hermetic sealing at the welds 51 and 52 non-functional or unnecessary, or else so as to provide two sealing barriers (see the element of FIG. 3).

As shown in FIG. 3, in an advantageous embodiment, at least O-rings 81 and 82 are disposed on either side of the weld 51 between the inner flange 31 of the jacket 3 and the inner flange 21 of the annular support 2. Similarly, at least O-rings 83 and 84 are disposed on either side of the weld 52 between the outer flange 32 of the jacket 3 and the outer flange 22 of the annular support 2.

Advantageously, as shown in FIG. 3, it is possible to place two O-rings 81 & 85; 82 & 86; 83 & 87; and 84 & 88 on either side of each weld 51 and 52 so as to provide double sealing.

Optionally, and as shown in FIG. 4, the annular jacket 3 may include flexibility grooves 91, 92 formed in the inner and outer flanges 31 and 32, respectively.

The flexibility grooves 91 and 92 serve to relieve stresses on the welds 51 and 52.

Naturally, the various embodiments described with reference to FIGS. 1, 3, 4, and 5 may be combined with one another.

Similarly, a second stator magnetic circuit 4 with an enclosure 2, 3 in accordance with the invention may be disposed symmetrically on the other side of the rotor armature 7 so as to form a double-acting axial abutment.

The present description does not describe position detectors or circuits for powering the jacketed active axial magnetic bearing, since these elements are conventional and independent of the way in which the enclosure 2, 3 is made.

What is claimed is:

1. A jacketed axial magnetic bearing for a rotary machine having a rotor in contact with a gaseous atmosphere that is corrosive, acid, or carrying particles, the bearing comprising a rotor armature in the form of a disk secured to the rotor and placed in said gaseous atmosphere, and a stator magnetic circuit secured to a stationary support device and placed facing said rotor armature, the magnetic circuit of the stator comprising at least one coil and a ferromagnetic body placed in a metallic protective enclosure, wherein said protective enclosure comprises firstly an annular support of channel section with a web and inner and outer flanges presenting a thickness of several millimeters and a length that is less than the length of the stator magnetic circuit, and secondly an annular jacket in the form of a channel-section cover machined from a solid piece and thus without welds, the jacket having inner and outer flanges and a closure web presenting a thickness smaller than the thicknesses of the inner and outer flanges, the free ends of the inner and outer flanges of the jacket being welded to the free ends of the inner and outer flanges of said annular support.

2. A bearing according to claim 1, wherein the annular jacket is shrink-fitted on said ferromagnetic body.

3. A bearing according to claim 1, wherein the annular jacket includes flexibility grooves formed in the inner and outer flanges.

4. A bearing according to claim 1, including at least first and second O-rings disposed on either side of the weld between the inner flange of the jacket and the inner flange of the annular support, and third and fourth O-rings disposed on either side of the weld between the outer flange of the jacket and the outer flange of the annular support.

5. A bearing according to claim 4, wherein each of said first, second, third, and fourth O-rings comprises a pair of O-rings providing double sealing.

6. A bearing according to claim 1, wherein the annular jacket and the annular support are made of magnetic stainless steel of the 17-4 PH type, or of Inconel.

7. A bearing according to claim 1, wherein the closure web of the annular jacket presents thickness lying in the range 0.3 mm to 2 mm.

8. A bearing according to claim 1, wherein the welds between the jacket and the annular support are formed on walls presenting thickness greater than 3 mm.

9. A bearing according to claim 1, wherein the welds between the jacket and the annular support are made by laser welding, by electron bombardment, or by TIG welding.

10. A bearing according to claim 1, wherein the airgap between the rotor armature and the stator magnetic circuit lies in the range 0.4 mm to 1.2 mm.

11. A bearing according to claim 2, wherein the annular jacket presents a coefficient of expansion that is smaller than that of the ferromagnetic body.

* * * * *